United States Patent
Cullum et al.

(10) Patent No.: US 6,983,656 B2
(45) Date of Patent: Jan. 10, 2006

(54) METHOD AND APPARATUS FOR AUTOMOTIVE RIM EDGE ANALYSIS AND CORRECTIVE WEIGHT SELECTION GUIDE

(75) Inventors: William David Cullum, Conway, AR (US); Wen-Yu Zhou, Conway, AR (US); Frederick J. Rogers, North Little Rock, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 134 days.

(21) Appl. No.: 10/740,770

(22) Filed: Dec. 22, 2003

(65) Prior Publication Data

US 2005/0132786 A1 Jun. 23, 2005

(51) Int. Cl.
*G01M 1/00* (2006.01)

(52) U.S. Cl. .......................... 73/487; 73/462

(58) Field of Classification Search ............ 73/66, 73/460, 462, 487; 702/56
See application file for complete search history.

(56) References Cited

U.S. PATENT DOCUMENTS

| | | |
|---|---|---|
| 4,489,607 A | 12/1984 | Park |
| 5,054,918 A | 10/1991 | Downing et al. |
| 5,189,912 A | 3/1993 | Quinlan et al. |
| 5,355,729 A | 10/1994 | Douglas |
| 5,471,874 A * | 12/1995 | Rothamel et al. ............. 73/462 |
| 5,827,964 A | 10/1998 | Douine et al. |
| 5,915,274 A | 6/1999 | Douglas |
| 6,122,957 A | 9/2000 | Bux et al. |
| 6,244,108 B1 | 6/2001 | McInnes et al. |
| 6,484,574 B1 | 11/2002 | Douglas et al. |

FOREIGN PATENT DOCUMENTS

| | | |
|---|---|---|
| GB | 2 338 565 A | 12/1999 |
| JP | 07229808 A | 8/1995 |

OTHER PUBLICATIONS

Snap-On Technologies, Inc (2001) "Introducing Snap-on's Next Generation Motorized Wheel Balancer For The Year 2001 And Beyond".
"Wheel Balancers VPI System III- Heavy Duty", 2001 Snap-On Technologies, Inc.
"6800/6800P" 2002 Hofmann.

* cited by examiner

*Primary Examiner*—Hezron Williams
*Assistant Examiner*—John Hanley
(74) *Attorney, Agent, or Firm*—McDermott Will & Emery LLP (57) ABSTRACT

A method of determining a type of corrective weight for application to an edge of a rim of a wheel for correcting imbalance of the wheel, including measuring dimensions of an edge of a rim of a wheel to produce measured dimensions, comparing the measured dimensions to actual dimensions of different types of rim edges, determining a type of rim edge the wheel has based upon the comparison between the measured dimensions and the stored dimensions, and indicating a type of corrective weight appropriate for application to the edge of the rim of the wheel based upon the type of rim edge determined.

20 Claims, 8 Drawing Sheets

"ALC-IW"

"ALC-EN"

FIG. 9

"ALC"

FIG. 6

"ALC-FN"

FIG. 10

"ALC-MC"

METHOD AND APPARATUS FOR AUTOMOTIVE RIM EDGE ANALYSIS AND CORRECTIVE WEIGHT SELECTION GUIDE

FIELD OF THE DISCLOSURE

The present disclosure is directed to motor vehicle wheel balancing systems, and more particularly to a method and an apparatus for use with such systems for automatically analyzing a rim edge of a wheel and suggesting the proper type of clip-on corrective weight to be secured to the rim edge.

DESCRIPTION OF THE RELATED ART

It is well known in the automotive wheel balancing art that to compensate for a combination of static imbalance (where the heaviest part of the wheel will seek a position directly below the mounting shaft) and couple imbalance (where the rotating wheel causes torsional vibrations on the mounting shaft), at least two correction weights are required which are separated axially along the wheel surface, coincident with weight location "planes". For clip-on weights the "left plane" comprises the left (innermost) rim lip or edge circumfrence while the "right plane" comprises the right rim edge. For adhesive weights, the planes can reside anywhere between the rim edges, barring physical obstruction such as wheel spokes and welds.

Many previous and existing wheel balancing systems utilize automatic wheel scanning devices to determine properties of a rim of a wheel (as used herein a wheel includes a rubber tire secured to a metal rim) during a wheel balancing procedure. U.S. Pat. No. 5,189,912 to Quinlan et al., for example, shows an apparatus for ultrasonic measurement, as well as a wheel balancing machine comprising such an apparatus. The apparatus detects the radius of a wheel rim and the distances separating respectively the internal and external surfaces of the wheel rim from a reference plane.

U.S. Pat. No. 5,054,918 to Downing et al. shows a structured light scanning system for a wheel balancer that observes, interprets and provides structural feature, size, position and movement data. The system includes light beam projection means mounted on the wheel balancer providing a light beam directed along a path toward a wheel rim/tire assembly on a spindle, optical means for converting the light beam to a beam contained in substantially a single plane, and light sensing means exposed to light reflected from the area on the rim/tire assembly impinged by the converted light beam for providing signals responsive thereto. Computer means are also provided for receiving the signals provided by the light sensing means for providing data relating to wheel rim/tire assembly feature locations, dimensions and physical configuration.

U.S. Pat. No. 5,827,964 to Douine et al. shows a device for the detection and measurement of the position of a turning wheel of an automotive vehicle. The device includes a source of illumination adapted to illuminate selectively the vicinity of the position to be detected and at least one detector of the luminous intensity receiving the radiation of the illuminated position so as to determine the geometric parameter representative of the position to be detected.

U.S. Pat. No. 5,915,274 to Douglas shows a wheel balancer having a mechanical sensing device coupled to an electronic measuring apparatus for scanning a wheel in a continuous motion and obtaining a profile of a rim of the wheel. The balancer computer analyzes the scanned profile and determines the best arrangement of correction weight locations and magnitudes. A display shows the scanned profile and the weights exactly as the physical wheel and placed weights appear, improving intuitiveness and providing confidence in the measuring apparatus. The correction weight magnitudes and locations can be manually adjusted via the user interface and a real-time display update of required weights and the corresponding residual imbalance.

U.S. Pat. No. 6,122,957 to Bux et al. shows a device for balancing a wheel including a unit for measuring the wheel imbalance and a unit for scanning the rim dimensions. The scanner unit and the imbalance-measuring unit are connected to a computer which determines a rim contour from the scanner unit output signals and then the optimum positions and dimensions for the balance weights from the contour determined in conjunction with values supplied by the imbalance-measuring unit.

U.S. Pat. No. 6,244,108 to McInnes, et al. shows a wheel balancer for balancing an alloy wheel. A telescoping extendible sensor arm physically detects balance weight receiving locations on a rim of the wheel at desired balancing planes. The balance weight receiving locations are indicated by a laser light source which directs a pencil laser beam at the rim to thereby indicate to an operator the precise position at which the correcting balance weight is to be attached to the rim.

U.S. Pat. No. 6,484,574 to Douglas et al. shows a wheel balancer including a rim measuring apparatus configured to scan the inner surface of the wheel rim/tire assembly. The optimum plane locations, amounts of correction weights, and the number of correction weights, are calculated by a control circuit to result in a minimized residual static and dynamic imbalance. The control circuit utilizes a motor drive to automatically index and hold the wheel at the proper rotational position for placement of an imbalance correction weight, and a laser pointer illuminates the surface of the rim at the axial position of the weight imbalance correction plane at which the imbalance correction weight is to be applied.

None of these previous and existing wheel balancing systems disclose or suggest a method and apparatus for automatically determining and suggesting a proper type of clip-on corrective weight to be secured to a rim edge of a wheel being balanced. What is still desired, therefore, is a method and apparatus for use with a wheel balancer for automatically determining and suggesting a proper type of clip-on corrective weight to be secured to a rim edge of a wheel being balanced. Preferably, the method and apparatus can be used with existing wheel balancers and existing wheel scanning devices.

SUMMARY OF THE DISCLOSURE

The present disclosure provides a method for determining a type of corrective weight for application to an edge of a rim of a wheel for correcting imbalance of the wheel. The method includes measuring dimensions of an edge of a rim of a wheel to produce measured dimensions, comparing the measured dimensions to actual dimensions of different types of rim edges, determining a type of rim edge the wheel has based upon the comparison between the measured dimensions and the stored dimensions, and indicating a type of corrective weight appropriate for application to the edge of the rim of the wheel based upon the type of rim edge determined.

The present disclosure also provides an apparatus for determining a type of corrective weight for application to an edge of a rim of a wheel for correcting imbalance of the wheel. The apparatus includes a scanning device for providing measured dimensions of an edge of a rim of a wheel, and a controller programmed to compare the measured dimensions to actual dimensions of different types of rim edges, determine a type of rim edge the wheel has based upon the comparison between the measured dimensions and the stored dimensions, and provide an indication of a type of corrective weight appropriate for application to the edge of the rim of the wheel based upon the type of rim edge determined.

Additional aspects and advantages of the present disclosure will become readily apparent to those skilled in this art from the following detailed description, wherein exemplary embodiments of the present disclosure are shown and described, simply by way of illustration of the best modes contemplated for carrying out the present disclosure. As will be realized, the present disclosure is capable of other and different embodiments and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF EXEMPLARY EMBODIMENTS

Figure 1:
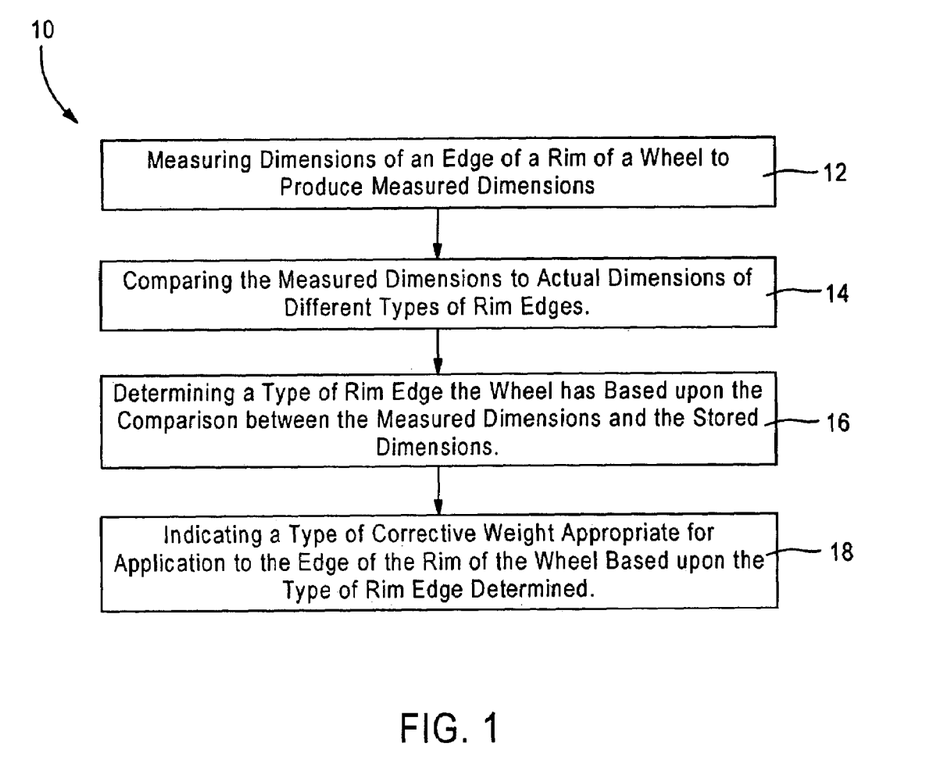
FIG. 1 is a flow chart illustrating an exemplary embodiment of a method, according to the present disclosure, for determining a type of corrective weight for application to an edge of a rim of a wheel for correcting imbalance of the wheel.
Figure 2:
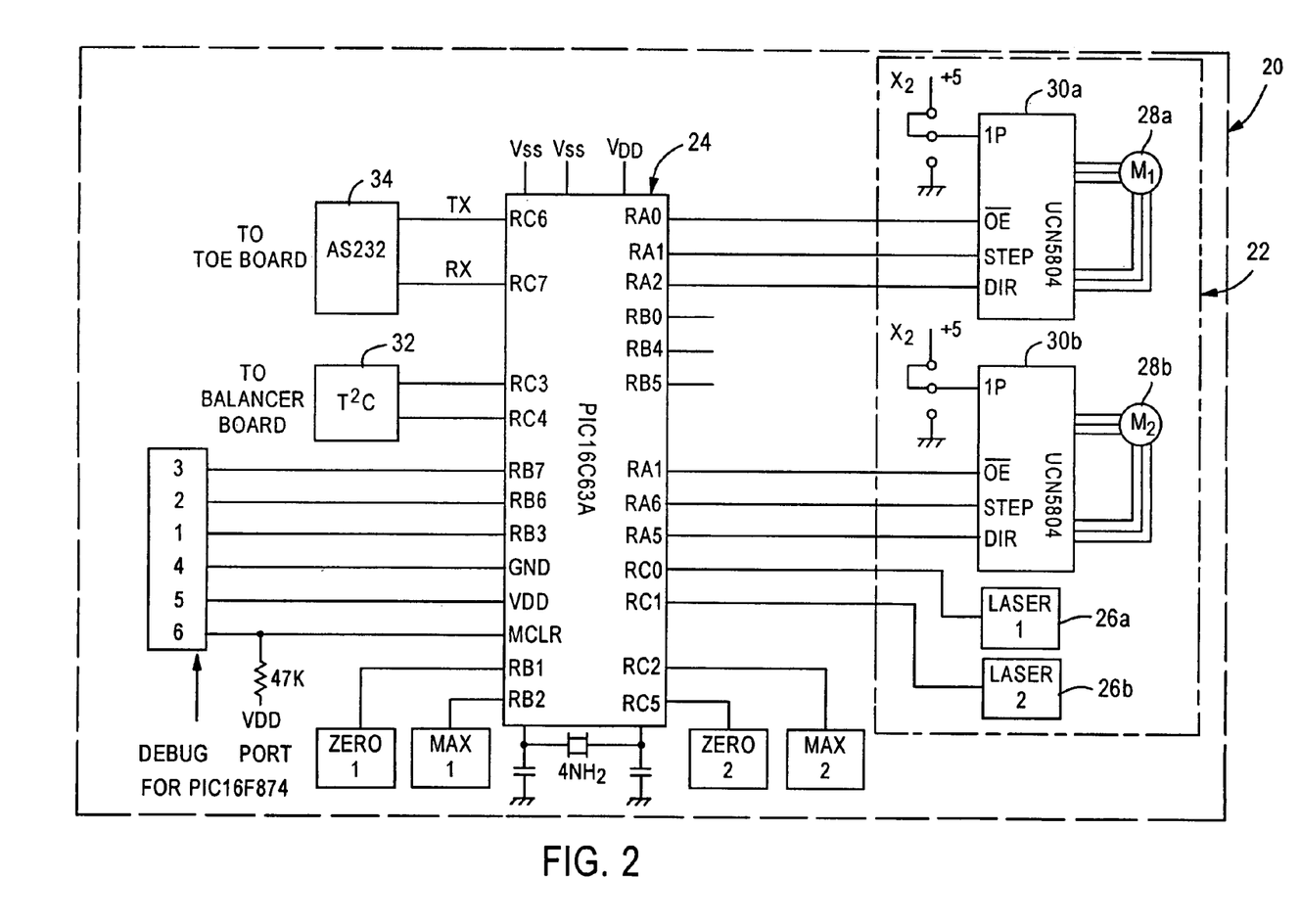
FIG. 2 is a schematic diagram of an exemplary embodiment of an apparatus according to the present disclosure for automatically determining and suggesting a proper type of clip-on corrective weight to be secured to a rim edge of a wheel, for use with the method of FIG. 1.
Figure 3:
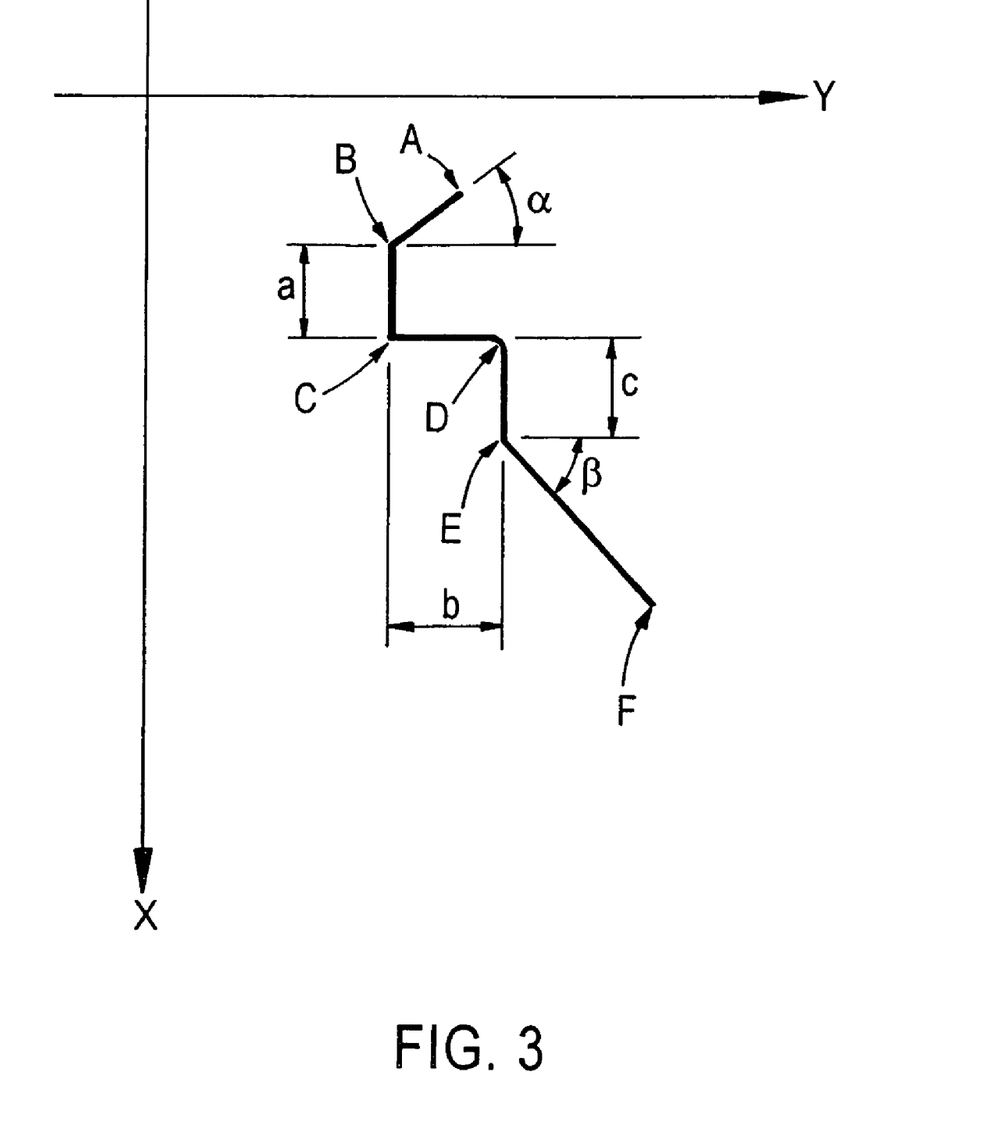
FIG. 3 is a diagram of a model of an edge of a rim of a vehicle wheel showing dimensions of the rim edge to be scanned as part of the apparatus and method of the present disclosure.
Figure 4:
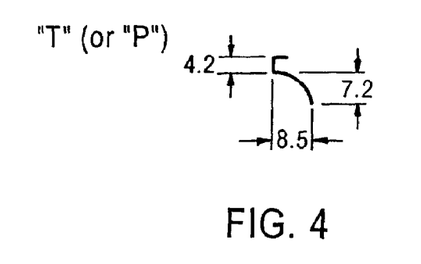
FIGS. 4 through 11 are diagrams showing actual dimensions for different rim edges based upon the model of FIG. 3.
Figure 5:
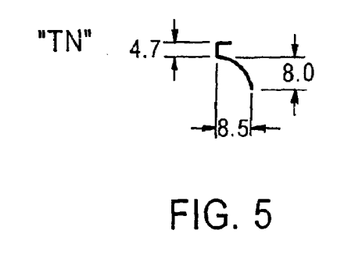
Figure 6:
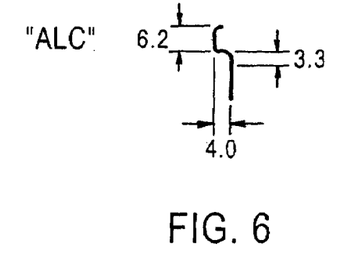
Figure 7:
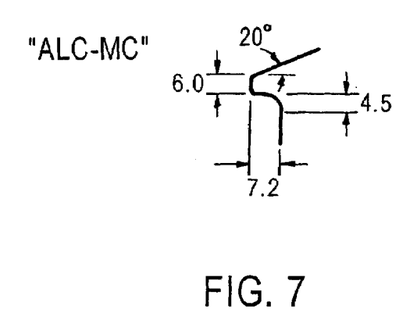

Referring to FIGS. 1 and 2, the present disclosure is directed to a method 10 and an apparatus 20 for automatically analyzing a rim edge of a wheel and suggesting a proper type of clip-on corrective weight to be secured to the rim edge. The method 10 and the apparatus 20 of the present disclosure can be used with, or incorporated into, motor vehicle wheel balancing systems and used to suggest the proper type of clip-on corrective weight once a proper amount of the weight has been determined by the balancing system. Before discussing the method 10 and the apparatus 20 of FIGS. 1 and 2, an exemplary embodiment of a balancing machine 100 according to the prior art will first be discussed to provide background information.

Figure 22:
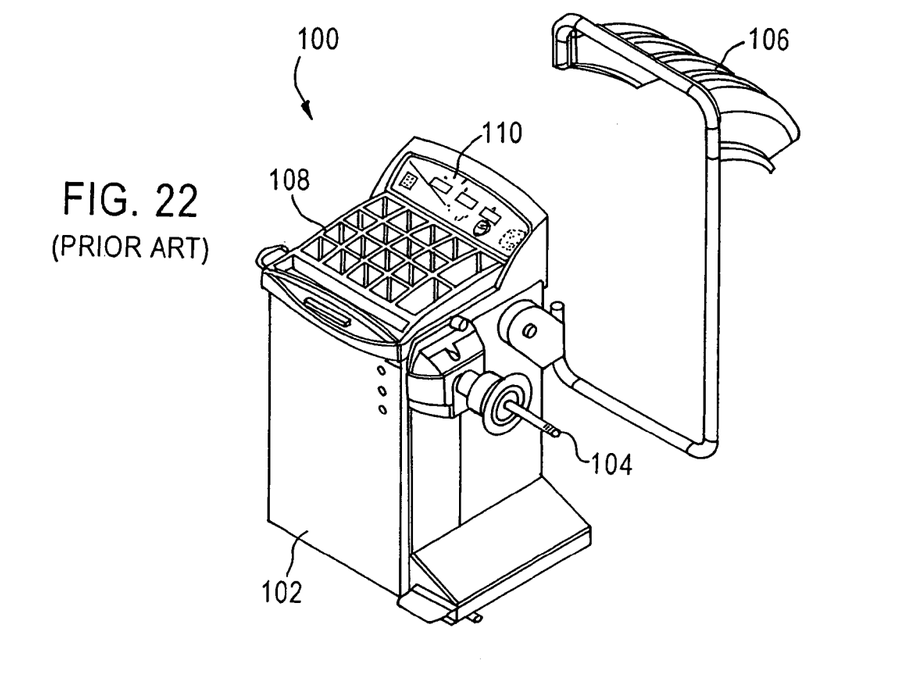
FIG. 22 is a perspective view of an exemplary embodiment of a balancing machine according to the prior art, which may utilize the apparatus and the method of the present disclosure (e.g., the embodiments shown in FIGS. 1 and 2) for automatically determining and suggesting a proper type of clip-on corrective weight to be secured to a rim edge of a wheel being balanced on the balancing machine.

Referring to FIG. 22, an exemplary embodiment of a balancing machine 100 according to the prior art and, which may be utilized with the apparatus and the method of the present disclosure, is shown. The balancing machine 100 includes a base 102 supporting a rotatable shaft 104 upon which a wheel to be balanced can be mounted. During a balancing procedure the wheel is rotated by a motor (not shown) that turns the rotatable shaft 104. The balancing machine 100 may also include a protective hood 106 for preventing undesirable or dangerous projections during rotation of the wheel, cases 108 for holding corrective balancing weights, and a control panel 110 having a display screen and a control panel.

The balancing machine 100 is programmable and can include several computer programs for measurement, standardization, accessory configuration, formatting and display, and computer programs for static and dynamic processing of the different types of rims, as well as a program for optimization of mounting of the tire on the rim so as to reduce the weight of the balancing weights that are used.

An example of a suitable wheel balancing machine for use with the apparatus and the method of the present disclosure is a model EEWB304A wheel balancer from the assignee of the present disclosure, Snap-On Incorporated of Kenosha, Wis. (www.snapon.com). It should be noted, however, that the apparatus and the method of the present disclosure are for use with other wheel balancing machines. Other suitable wheel balancers, for example, include the model Geodyna 6800/6800P wheel balancer, which is available from Hoffmann Canada of Belleville, Ontario (www.hofmann.com), and the type VPI™ wheel balancer available from John Bean Company of Conway Ark. (ww.johnbean.com).

Figure 23:
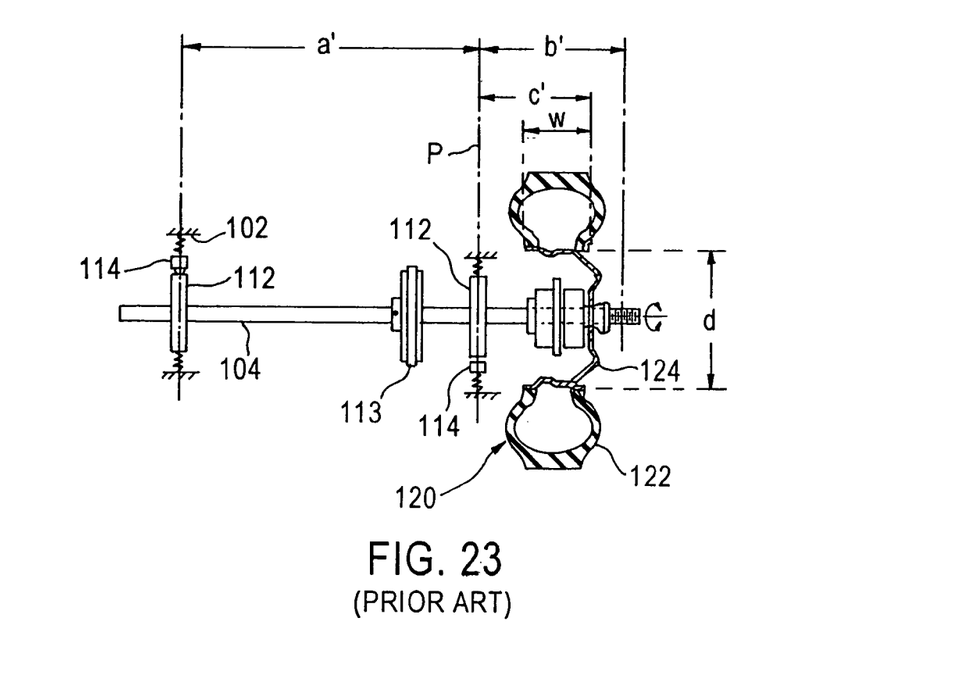
FIG. 23 is a diagrammatic elevation view of portions of the balancing machine of FIG. 22, with a vehicle wheel shown in section on a shaft of the balancing machine.

Referring to FIG. 23, a vehicle wheel 120 is shown mounted on the shaft 104 of the balancing machine of FIG. 22. The wheel 120 includes a rubber tire 122 mounted on a metal rim 124. The shaft 104 is mounted on bearings 112 supported by the base 102 of the wheel balancer, and rotationally driven through a pulley 113. A pair of force transducers 114 are mounted in the base 102 adjacent to and spaced axially along the shaft 104 at the locations of the bearings 112. The force transducers 114 are coupled mechanically to the shaft 104 and provide periodic electrical output signals indicative of dynamic unbalance forces transmitted through the shaft when the shaft is driven rotationally. The angular position of the shaft 104 is monitored by a shaft encoder (not shown) during each full revolution of the shaft. The transducer 114 output signals are usually digitized in electrical circuitry within the balancer and calculations are performed on the digitized signals to obtain unbalance force measurements at each angular increment of shaft rotation. The calculation of the unbalance forces requires that certain measurements be made relative to the mounting location of the rim 124 and the tire 122 on the shaft 104.

The distances a' and b' are known from the physical configuration of the balancer. The distances c' and "w" must be measured to obtain the inside and outside rim position locations so that a proper type of clip-on corrective weights may be applied to the rim 124 to offset unbalance in the wheel 120 which is measured when the wheel is spun rotationally on the shaft 104. The rim measurements are can be made from the plane P, and the diameter "d" of the rim 124 may also be measured. A scanning device, such as one of the exemplary embodiments shown in FIGS. 24–27, is capable of making these measurements relative to a coordinate system which is referenced to the structure of the balancing machine.

Figure 24:
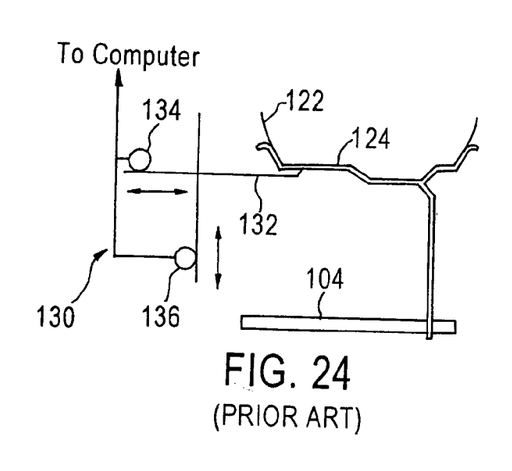
FIGS. 24 through 27 are enlarged diagrammatic elevation views of exemplary embodiments of devices for scanning a rim of the vehicle wheel according to the prior art, which may be utilized with the apparatus and method of the present disclosure and with the balancing machine of FIG. 22.

FIG. 24 is an enlarged diagrammatic elevation view of an exemplary embodiment of a device 130 according to the prior art for scanning the rim of the vehicle wheel, which may be utilized with the apparatus and method of the present disclosure and with the balancing machine of FIG. 22. The scanning device includes a pick-up 132 which may be moved by means of a motor 134 in the horizontal direction (i.e. in parallel to the shaft) and by means of a motor 136 in the vertical direction (i.e. perpendicular to the shaft). The pick-up device 132 is connected to a computer (not shown). In operation, the pick-up 132 is moved along the inner outline of the rim 124 by means of the two motor drives 134, 136, wherein the horizontal and vertical positions of the pick-up 132 are detected either through the drives (e.g. stepping motors) themselves or by appropriate sensors (not shown). The output signals of the pick-up device 132 are transferred to the computer which evaluates the inner outline of the rim 124 in all points from the complete set of the signals. In a simpler embodiment, wherein the drives are omitted, the pick-up 132 is guided manually and along the outline of the rim 124, and the horizontal and vertical positions of the pick-up 132 are detected by sensors.

Figure 25:
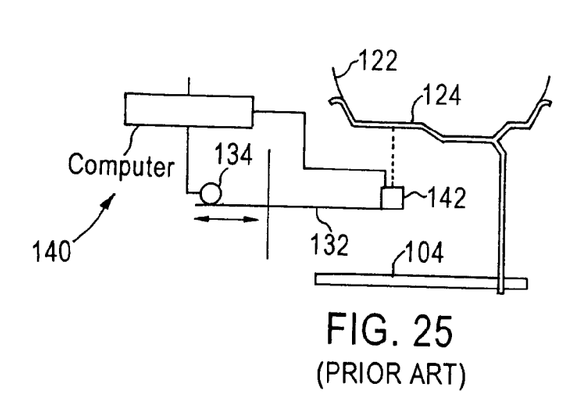

A second embodiment of a device 140 according to the prior art for scanning the rim 124 is shown in FIG. 25 and differs from the preceding embodiment in that the pick-up device comprises a distance meter 142 which is manually movable or by means of the drive 134 in the horizontal direction, the distance between the distance meter 142 and the respective point addressed at the outline of the rim 124 being detected. The computer then evaluates from this measurement the complete outline of the rim 124 and takes this into account when calculating the balancing values. The distance meter for measuring the distance to the respective point addressed at the outline of the rim may be a mechanical, optical, ultrasonic or electrical (inductive or capacitive) distance meter.

Figure 26:
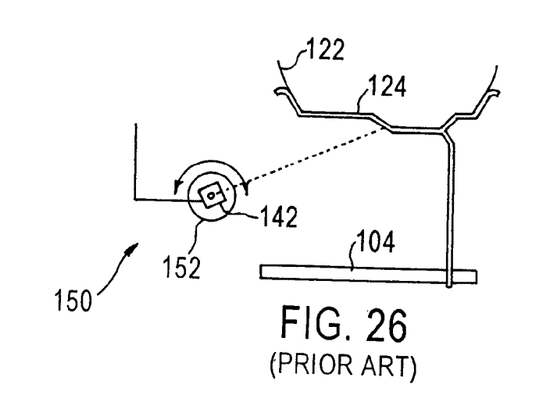

Another possible embodiment of a device 150 according to the prior art for scanning the rim 124 is shown in FIG. 26, and includes a pivotally mounted distance meter 142. The movements in the horizontal and vertical directions are replaced by pivoting movement of the distance meter 142, either manually pivotal or by means of a drive motor 152. Also in this case, the distance between the distance meter and the respective point addressed at the outline of the rim is detected, and the computer then evaluates from this measurement the complete outline of the rim 124 and takes this into account in the calculation of the balancing values.

Figure 27:
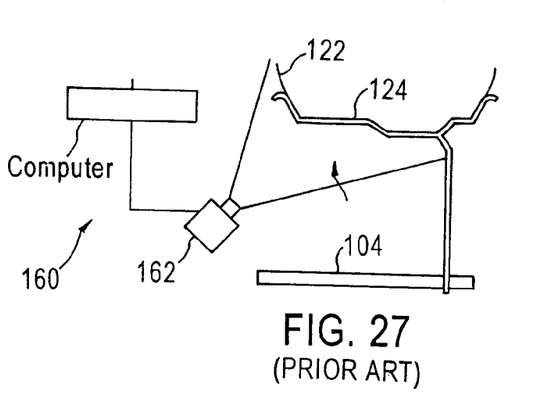

A further possible embodiment of a device 160 according to the prior art for scanning the rim 124 is shown in FIG. 27. Instead of the distance meter, a camera 162 is provided whose picture scanning area is chosen such that the inner outline of the rim 124 may by scanned completely. The camera 162, therefore, does not have be moved back and forth or pivoted. The camera 162 converts the received picture into electrical signals which are processed in the connected computer in such a way that the outline of the rim 124 is evaluated from the picture of the scanned portion of the rim.

In all of the embodiments of FIGS. 24-27, a display device may be connected to the computer to graphically show the evaluated outline, as well as the optimal balancing values at the corresponding positions of the outline as determined by the computer. By means of the display, therefore, the optimal positions for mounting the balancing weights at the rim of the wheel may be graphically displayed for an operator.

Referring again to FIG. 1, the exemplary embodiment of the method 10 of the present disclosure includes measuring dimensions of an edge of a rim of a wheel to produce measured dimensions, as shown at 12, comparing the measured dimensions to actual dimensions of different types of rim edges, as shown at 14, determining a type of rim edge the wheel has based upon the comparison between the measured dimensions and the stored dimensions, as shown at 16, and indicating a type of corrective weight appropriate for application to the edge of the rim of the wheel based upon the type of rim edge determined, as shown at 18.

Referring to FIG. 2, the exemplary embodiment of the apparatus 20 of the present disclosure includes a scanning device 22 for providing measured dimensions of an edge of a rim of a wheel, and a controller 24 programmed to compare the measured dimensions to actual dimensions of different types of rim edges, determine a type of rim edge the wheel has based upon the comparison between the measured dimensions and the stored dimensions, and provide an indication of a type of corrective weight appropriate for application to the edge of the rim of the wheel based upon the type of rim edge determined.

In the exemplary embodiment of FIG. 2, the scanning device 22 includes two lasers 26a, 26b, each of which is movable relative to a wheel by stepper motors 28a, 28b operated through drivers 30a, 30b. The lasers 26a, 26b can be used to determine basic dimensions of the rim of the wheel (such as the width w and the diameter d of the wheel), as well as dimensions of the rim edge of the wheel. The lasers 26a, 26b and the drivers 30a, 30b are connected to the controller 24, which is connectable to a balancing machine through a connector 32 and connectable to a user interface device through a connector 34.

In an alternative embodiment of the apparatus and method of the present invention, the lasers and motors can simply be incorporated into the wheel balancing machine and utilize the microcontroller of the wheel balancing machine, which can be reprogrammed to carry out the method of the present invention. If the wheel balancing machine already has a scanning device, then the microcontroller of the wheel balancing machine can simply be reprogrammed to carry out the method of the present invention.

According to one exemplary embodiment, the microcontroller 24 comprises a PIC16C63A Device CMOS OTP-based 8-bit microcontroller available from Microchip Technology Incorporated of Chandler, Ariz. (www.microchip.com), and the drivers 30, 30b comprises UCN5804 stepper-motor translator drivers available from Allegro Microsystems, Inc. of Worcester, Mass. (www.allegromicro.com). In one exemplary embodiment, the dimensional scanning lasers 26a, 26b have a wavelength of 650 nm, output power of less than 1 mW (Class II), input voltage of 5V, TTL modulation greater than or equal to 100 kHz, a circular or elliptical spot lens, a collimated beam size of about 0.2 mm in a range of 90–550 mm from the module, a pointing accuracy of less than 3 mrad, and dimensions of about 15 mm in diameter and 44 mm in length. Such lasers typically cost about $100 and are available from Stockeryale, Inc. of Salem, N.H. (www.stockeryale.com), and Laser Components Instrument Group of Wilmington, Mass. (www.laser-components.com).

Figure 8:
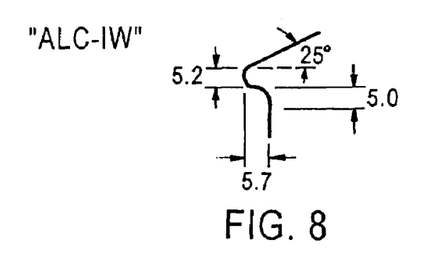
Figure 9:
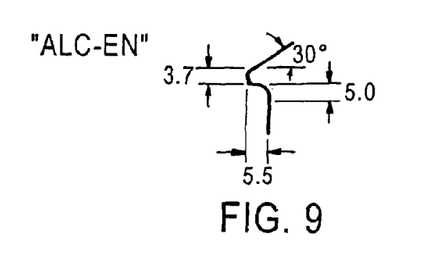
Figure 10:
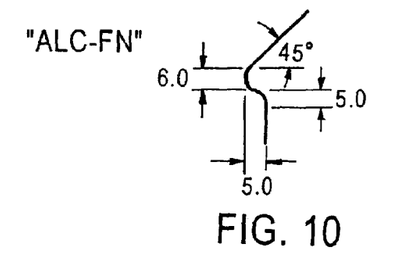
Figure 11:
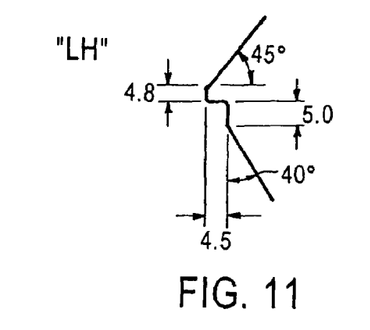
Figure 12:
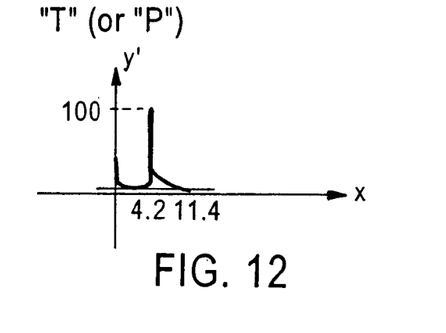
FIG. 12 through 19 are graphs showing derivatives of the actual dimensions of the different rim edges based upon the model of FIG. 3.
Figure 13:
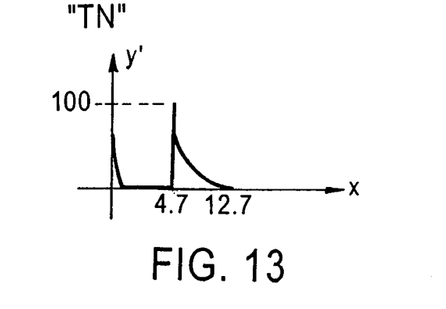
Figure 14:
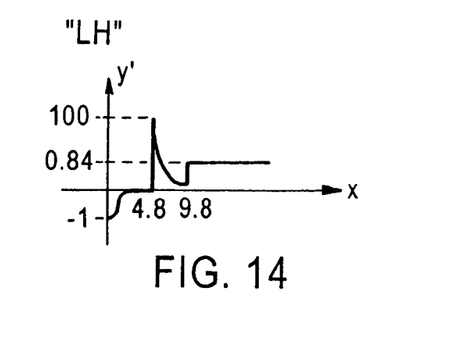
Figure 15:
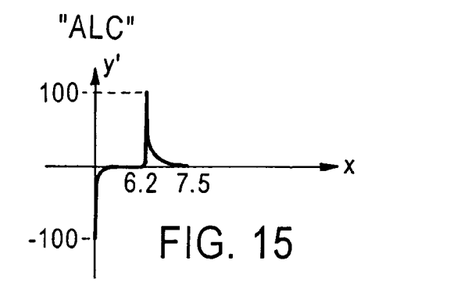
Figure 16:
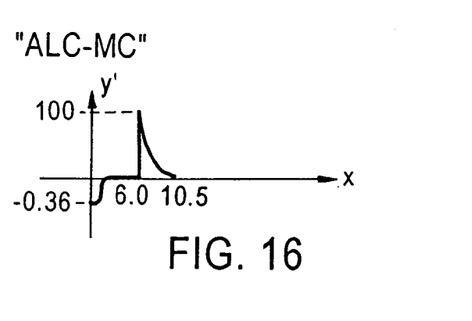
Figure 17:
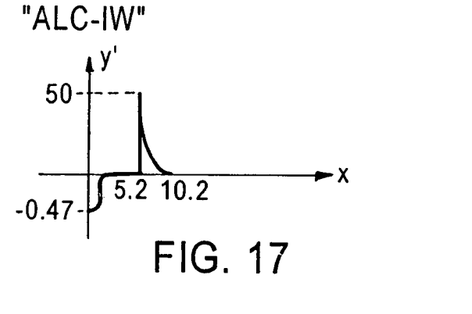
Figure 18:
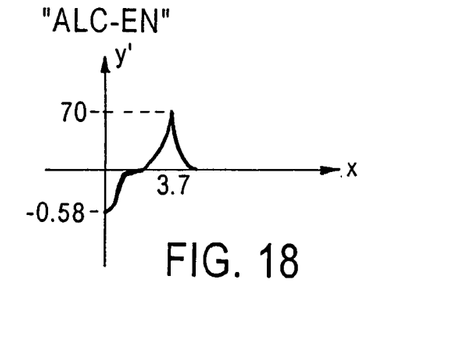
Figure 19:
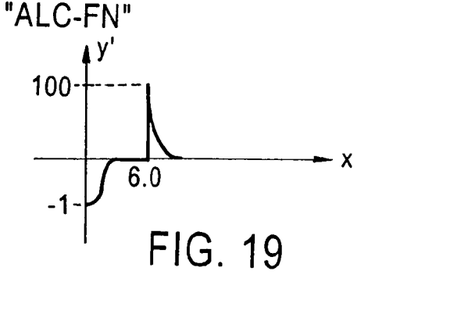

FIG. 8 is a diagram of a model of a profile of an edge of a rim of a vehicle wheel showing dimensions of the rim edge to be scanned as part of the apparatus and method of the present disclosure. As shown, the edge includes transition points A, B, C, D and F. Dimensions of the rim edge to be scanned can include, for example, an angle "α" of a segment of the rim edge extending between points A and B; a length "a" of a segment of the rim edge extending between points B and C; a length "b" of a segment extending between points C and D; a length "c" of a segment extending between points D and E; and an angle "β" of a segment extending between points E and F.

FIGS. 9 through 16 are diagrams showing actual values for the dimensions a, b, c, α, and β for different types of rim edges. These values are also presented here in Table I.

TABLE I

Dimensions of Wheel Rim Edge for Different Types of Clip-On Corrective Weights

|  | Dimension "a" | Dimension "b" | Dimension "c" | Dimension "α" | Dimension "β" |
|---|---|---|---|---|---|
| Type T | 4.2* | 8.5 | 7.2* | 0° | 0° |
| Type TN | 4.7* | 8.5 | 8.0* | 0° | 0° |
| Type LH | 4.8 | 4.5 | 5.0 | 45° | 40°* |
| Type ALC | 6.2 | 4.0 | 3.3* | 0°* | 0° |
| Type ALC-MC | 6.0 | 7.8* | 4.5* | 20° | 0° |
| Type ALC-IW | 5.2* | 5.7 | 5.0* | 25° | 0° |
| Type ALC-EN | 3.7* | 5.5 | 5.0 | 30°* | 0° |
| Type ALC-FN | 6.0* | 5.0 | 5.0 | 45°* | 0° |

These values are stored in memory of the microcontroller 24 of the apparatus 20 of FIG. 2, and are compared to scanned dimensions to determine the type of wheel rim edge being scanned. Values with an asterisk are keys used to recognize the type of wheel rim edge. For example, a large "c" value and a small "a" value indicates that the scanned wheel rim edge is one of a type T or a type TN, and if the "c" value is less than 8.0 and the "a" value is less than 4.7, then the scanned wheel rim edge is a type T. If the β value is equal to 40°, then the scanned wheel rim edge is a type LH. If the α value is equal to 0° and the "c" value is less than 4.0, then the scanned wheel rim edge is a type ALC. If the "b" is large and the "c" value is small, then the scanned wheel rim edge is a type ALC-MC. If the "a" and the "c" values are almost equal, then the scanned wheel rim edge is a type ALC-IW. If the a value is equal to 30° and the "a" value is the smallest, then the scanned wheel rim edge is a type ALC-EN. If the α value is equal to 45° and the "a" value is about equal to 6, then the scanned wheel rim edge is a type ALC-FN.

FIG. 17 through 24 are Y'-X graphs showing derivatives of actual values for the dimensions a, b, c, α, and β for different types of rim edges different rim edges. The derivatives include a value of y' at a first peak of the graph, the value of x at a second peak of the graph, y' at the second peak of the graph, and y' at a plateau (if present) of the graph. These values are also presented here in Table II.

TABLE II

Derivatives of Wheel Rim Edge for Different Types of Clip-On Corrective Weights

|  | $y'_1$ | x | $y'_2$ | $y'_{plateau}$ |
|---|---|---|---|---|
| Type T | 100* | 4.2* | 100* | n/a |
| Type TN | 100* | 4.7* | 100* | n/a |
| Type LH | −1.0 | 4.8 | 100 | 0.84* |
| Type ALC | −100* | 6.2 | 100* | n/a |
| Type ALC-MC | −0.4* | 6.0 | 100* | n/a |
| Type ALC-IW | −0.5 | 5.2* | 50* | n/a |
| Type ALC-EN | −0.6 | 3.7* | 70* | n/a |
| Type ALC-FN | −1.0* | 6.0 | 100* | n/a |

These values are stored in memory of the microcontroller 24 of the apparatus 20 of FIG. 2, and are compared to derivatives of scanned dimensions to determine the type of wheel rim edge being scanned. Values with an asterisk are keys used to recognize the type of wheel rim edge. According to one embodiment of the present disclosure, the method includes obtaining y=y(x) from the scanners, calculating y'=y'(x), comparing the key data (values with an asterisk) of tables I and II to the y and y' values, and indicating the type of wheel rim being scanned based upon the comparison.

Figure 20:
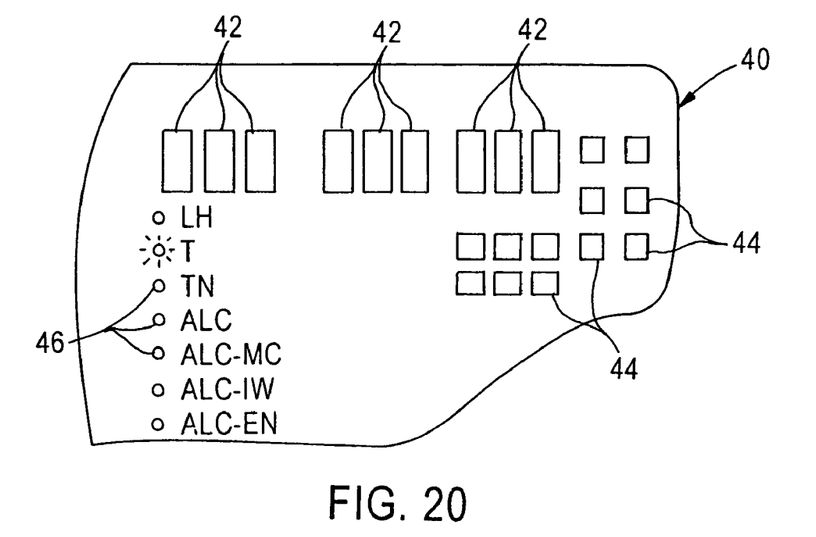
FIG. 20 is a front elevation view of an exemplary embodiment of a user interface device for use as part of the apparatus of FIG. 2 and the method of FIG. 1.

FIG. 20 is a front elevation view of an exemplary embodiment of a user interface device 40 for use as part of the apparatus and method of the present disclosure. The user interface device 40 is sized and shaped to be conveniently held in a user's hand, and may be connected (through a cable or wirelessly) to the controller 24 of the apparatus 20 of FIG. 2, for example. The device 40 includes display elements, such as seven-segment LEDs 42, for displaying the amount of corrective weights to be applied to a rim edge of a wheel being balanced and switches 44 for allowing user input. The device 40 also includes display elements, such as LED's 46, for providing an indication of the type of clip-on corrective weight to be applied.

Figure 21:
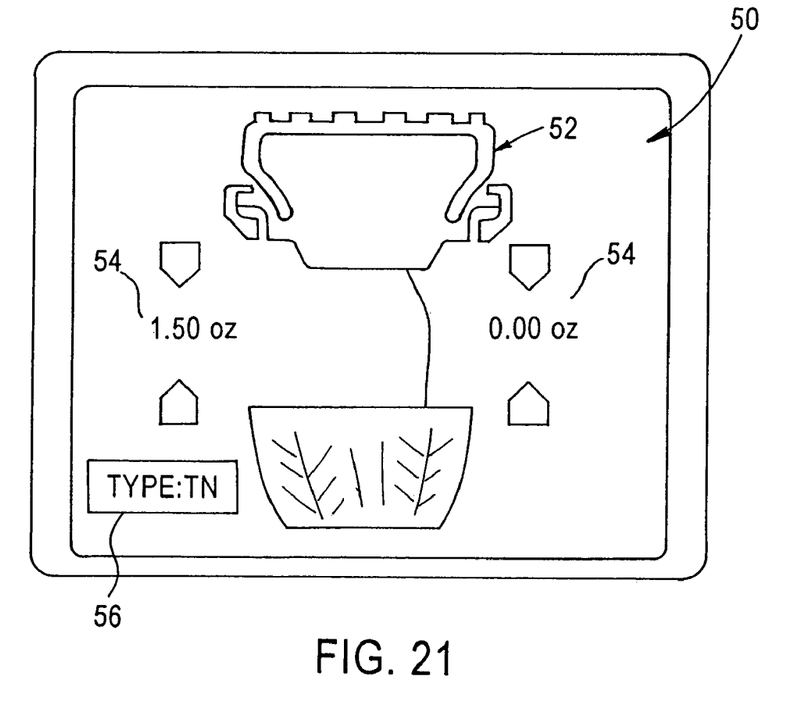
FIG. 21 is a front elevation view of an exemplary embodiment of a computer display for use as part of the apparatus of FIG. 2 and the method of FIG. 1.

FIG. 21 is a front elevation view of an exemplary embodiment of a computer display screen 50 for use as part of the apparatus and method of the present disclosure. The display screen 50 may be generated by the controller 24 of the apparatus 20 of FIG. 2, for example, on a computer monitor, and includes a display 52 of a cross-section of a wheel, including a rim and a tire, displays 54 of amounts of corrective weights to be applied to each edge of the rim of the wheel, and a display 56 of the proper type of clip-on corrective weights to be secured to the rim edges of the wheel.

Thus, the present disclosure provides methods and apparatuses for use with wheel balancers for automatically analyzing a rim edge of a wheel and suggesting a proper type of clip-on corrective weight to be secured to the rim edge of the wheel. The exemplary embodiments described in this specification have been presented by way of illustration rather than limitation, and various modifications, combinations and substitutions may be effected by those skilled in the art without departure either in spirit or scope from this disclosure in its broader aspects and as set forth in the appended claims. All methods and apparatuses disclosed herein, and all elements thereof, are contained within the scope of at least one of the following claims. No elements of the presently disclosed methods and apparatuses are meant to be disclaimed.

What is claimed is:

1. A method for determining a type of corrective weight for application to an edge of a rim of a wheel for correcting imbalance of the wheel, comprising:
   measuring dimensions of an edge of a rim of a wheel to produce measured dimensions;
   comparing the measured dimensions to actual dimensions of different types of rim edges;
   determining a type of rim edge the wheel has based upon the comparison between the measured dimensions and the stored dimensions; and
   indicating a type of corrective weight appropriate for application to the edge of the rim of the wheel based upon the type of rim edge determined.

2. A method according to claim 1, wherein the corrective weight comprises a type of clip-on corrective weight.

3. A method according to claim 1, wherein the dimensions of the edge of the rim of the wheel are measured using at least one of a laser, a mechanical, an optical, an ultrasonic, and an inductive, or a capacitive distance meter.

4. A method according to claim 1, wherein additional dimensions of the rim of the wheel are measured and used to obtain imbalance data for the vehicle wheel, and the imbalance data is used to determine the value of the corrective weight for application to the edge of the rim of the wheel for correcting imbalance of the wheel.

5. A method according to claim 4, wherein the additional dimensions of the rim of the wheel include a width of the rim and a diameter of the rim.

6. A method according to claim 4, further comprising:
   electronically displaying to a human user a graphical representation of a profile of the measured rim; and
   electronically displaying the type of corrective weight appropriate for application to the edge of the rim of the wheel.

7. A method according to claim 4, wherein at least two correction weight plane locations are located at opposing edges of the rim.

8. A method according to claim 1, wherein the type of corrective weight comprises at least one of T, TN, ALC, ALC-MC, ALC-IW, ALC-EN, ALC-FN, and LH.

9. A method according to claim 1, wherein the type of corrective weight is for application to a rim made of one of steel and alloy.

10. A method according to claim 1, wherein a derivative analysis is used to compare the measured dimensions to actual dimensions of different types of rim edges.

11. An apparatus for determining a type of corrective weight for application to an edge of a rim of a wheel for correcting imbalance of the wheel, comprising:
   a scanning device for providing measured dimensions of an edge of a rim of a wheel;
   a memory storing actual dimensions of different types of rim edges; and
   a controller connected to the scanning device and the memory and programmed to,
      compare the measured dimensions of the edge of the rim to the actual dimensions of different types of rim edges;
      determine a type of rim edge the wheel has based upon the comparison between the measured dimensions and the stored dimensions; and
      indicate a type of corrective weight appropriate for application to the edge of the rim of the wheel based upon the type of rim edge determined.

12. An apparatus according to claim 11, wherein the corrective weight comprises a type of clip-on corrective weight.

13. An apparatus according to claim 11, wherein the dimensions of the edge of the rim of the wheel are measured using at least one of a laser, a mechanical, an optical, an ultrasonic, and an inductive, or a capacitive distance meter.

14. An apparatus according to claim 11, wherein additional dimensions of the rim of the wheel are measured and used to obtain imbalance data for the vehicle wheel, and the imbalance data is used to determine the value of the corrective weight for application to the edge of the rim of the wheel for correcting imbalance of the wheel.

15. An apparatus according to claim 14, wherein the additional dimensions of the rim of the wheel include a width of the rim and a diameter of the rim.

16. An apparatus according to claim 14, further comprising:
   electronically displaying to a human user a graphical representation of a profile of the measured rim; and
   electronically displaying the type of corrective weight appropriate for application to the edge of the rim of the wheel.

17. An apparatus according to claim 14, wherein at least two correction weight plane locations are located at opposing edges of the rim.

18. An apparatus according to claim 11, wherein the type of corrective weight comprises at least one of T, TN, ALC, ALC-MC, ALC-IW, ALC-EN, ALC-FN, and LH.

19. An apparatus according to claim 11, wherein the type of corrective weight is for application to a rim made of one of steel and alloy.

20. An apparatus according to claim 11, wherein a derivative analysis is used to compare the measured dimensions to actual dimensions of different types of rim edges.

* * * * *